Jan. 28, 1969 W. G. PONTIS 3,424,011
POWER TRANSMISSION DEVICE PARTICULARLY FOR FLUID APPLICATIONS
Filed Sept. 26, 1967 Sheet 1 of 6
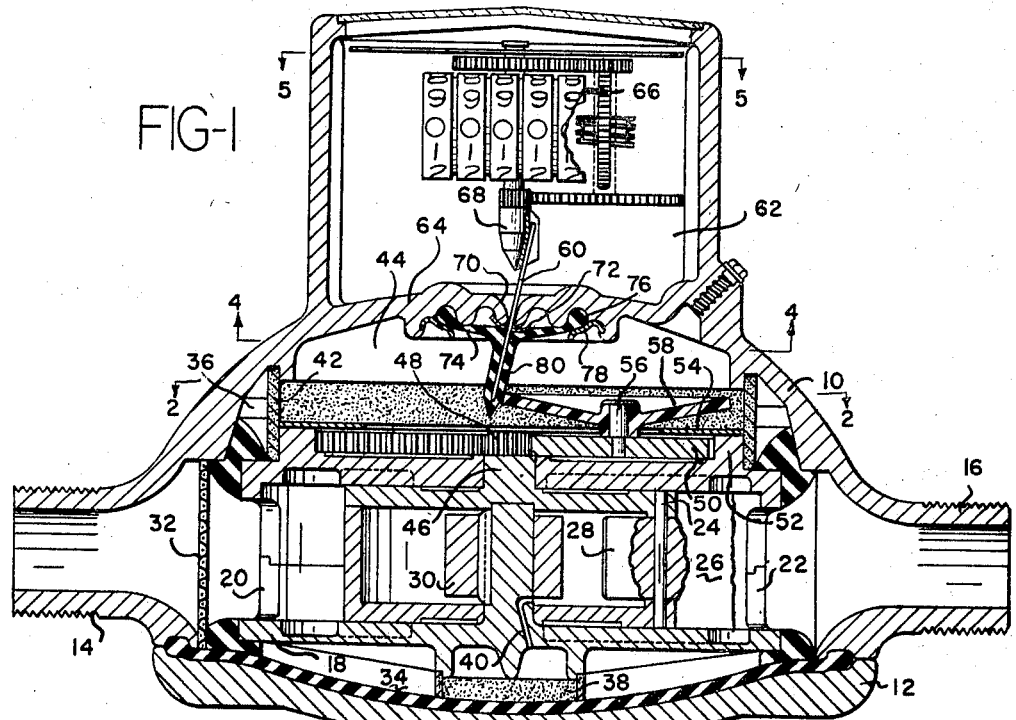
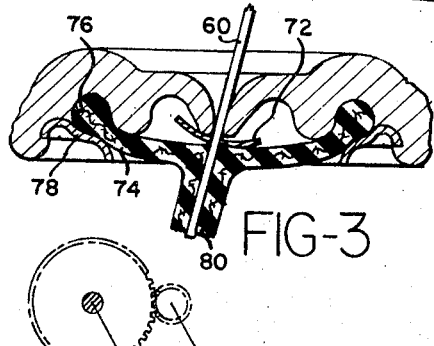
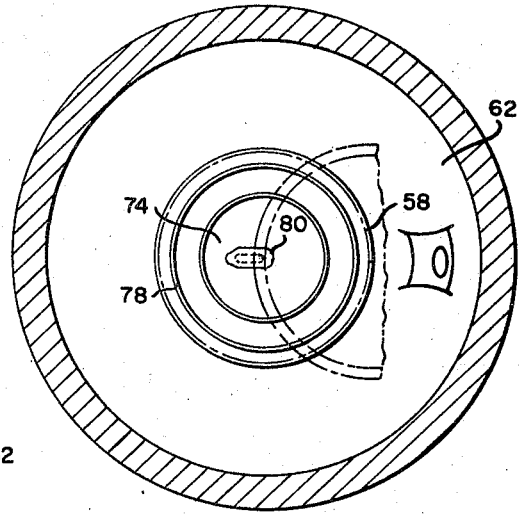
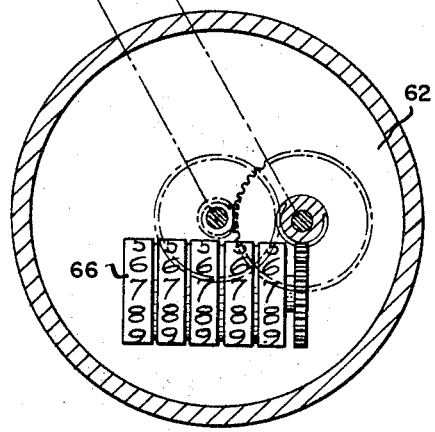
INVENTOR.
WILLIAM GRANT PONTIS
BY
ATTORNEYS

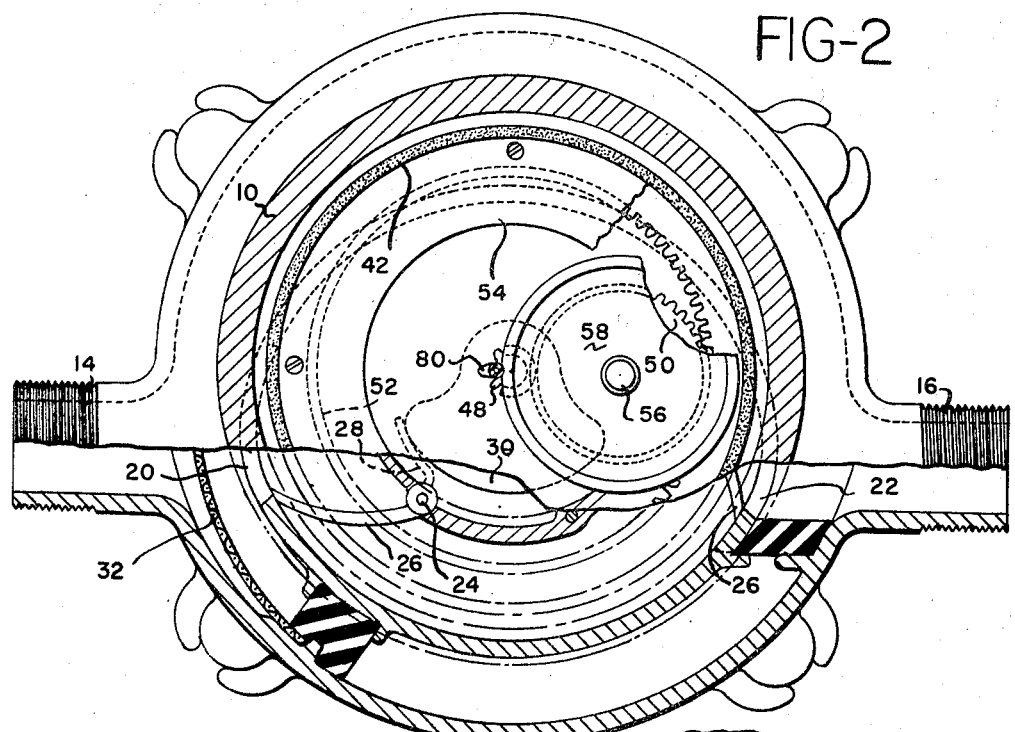
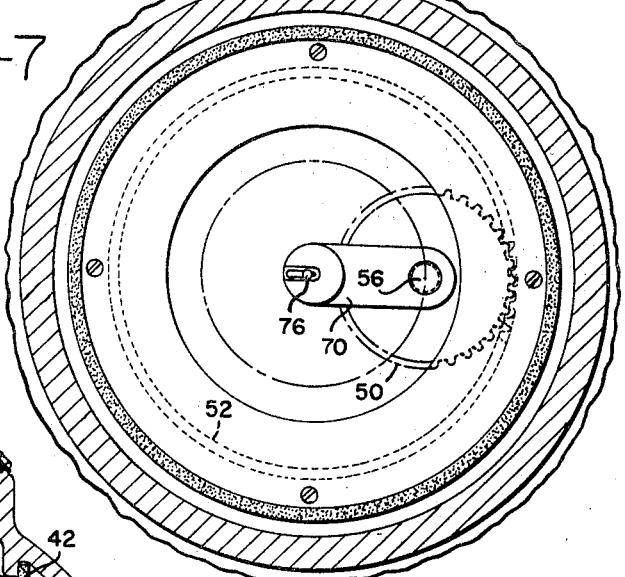
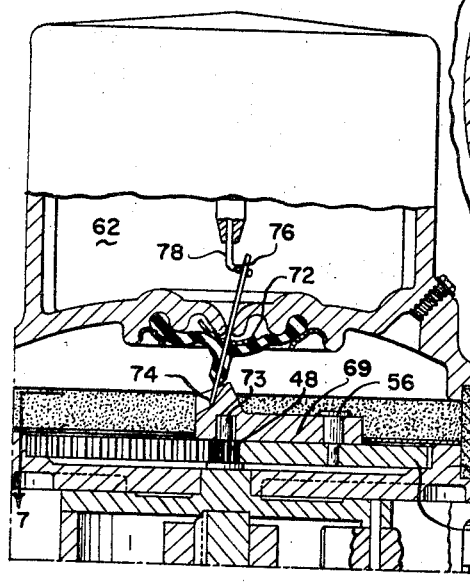
INVENTOR.
WILLIAM GRANT PONTIS
BY Toulmin & Toulmin
ATTORNEYS

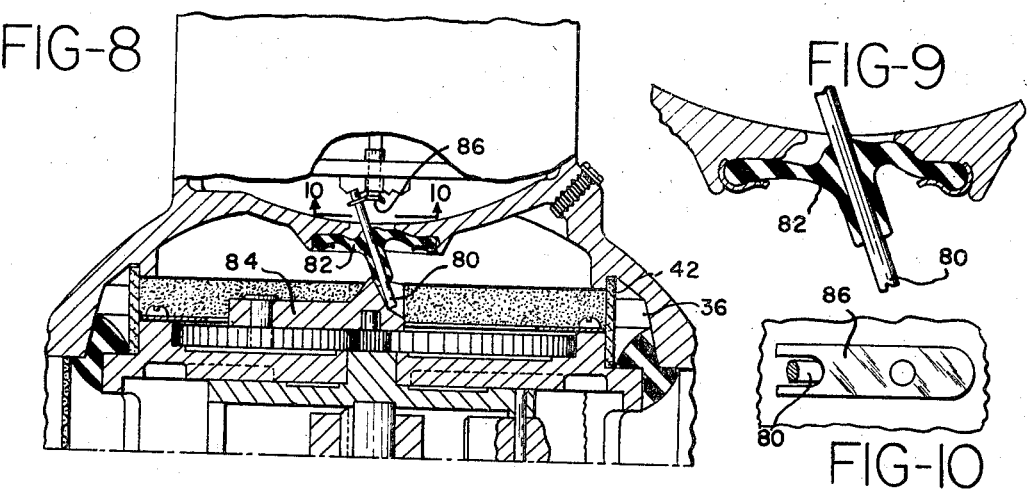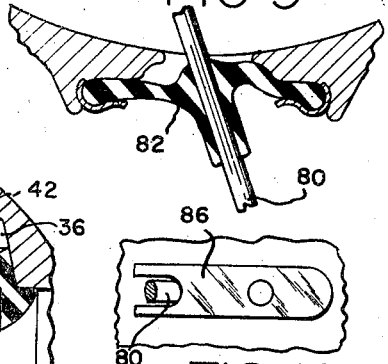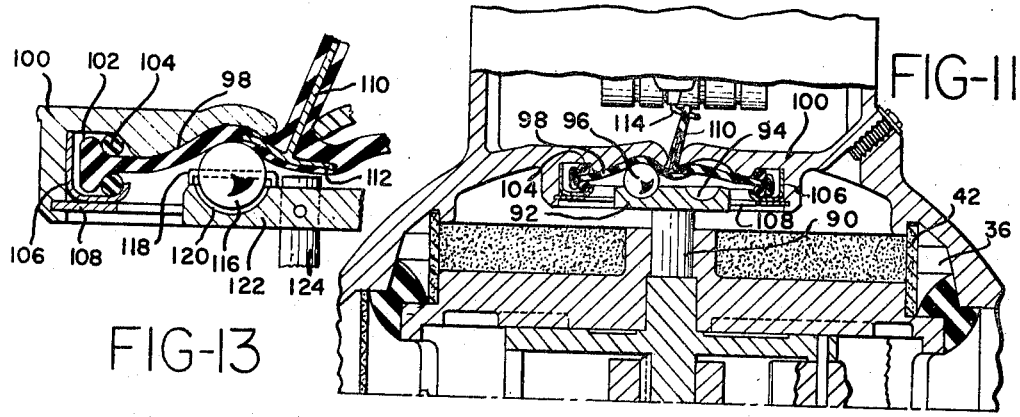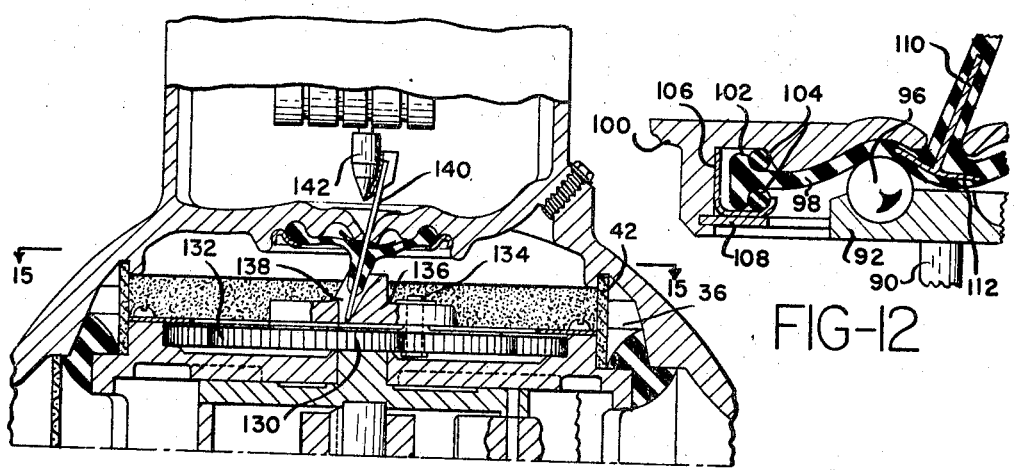

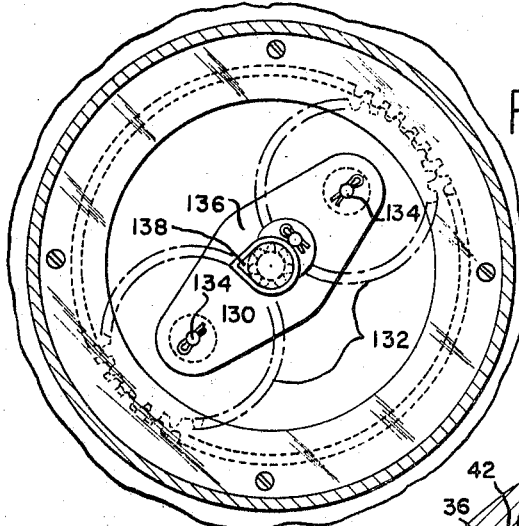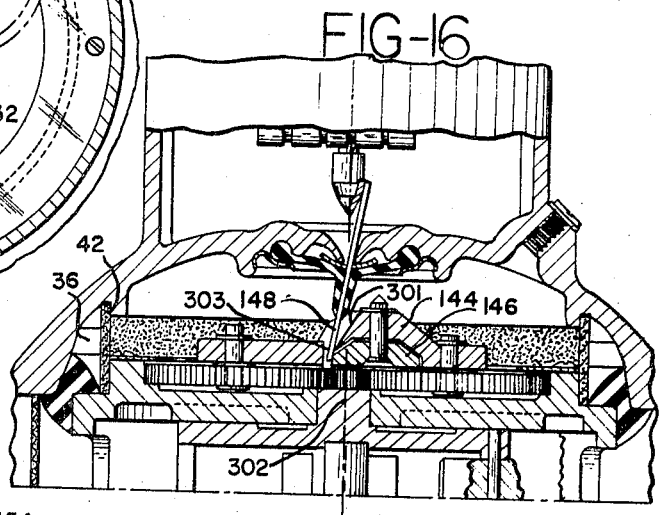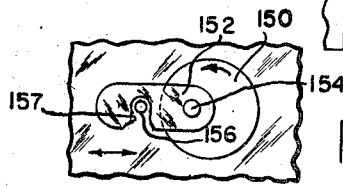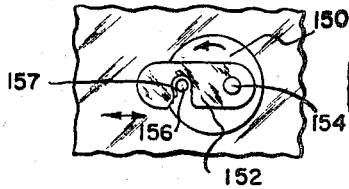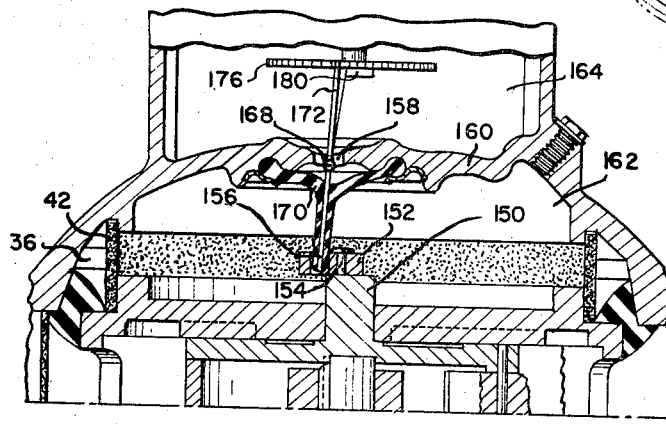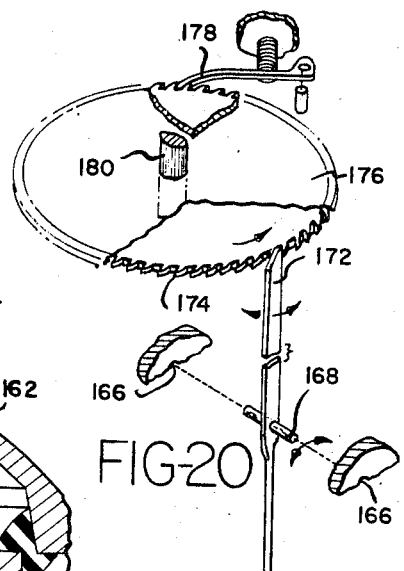

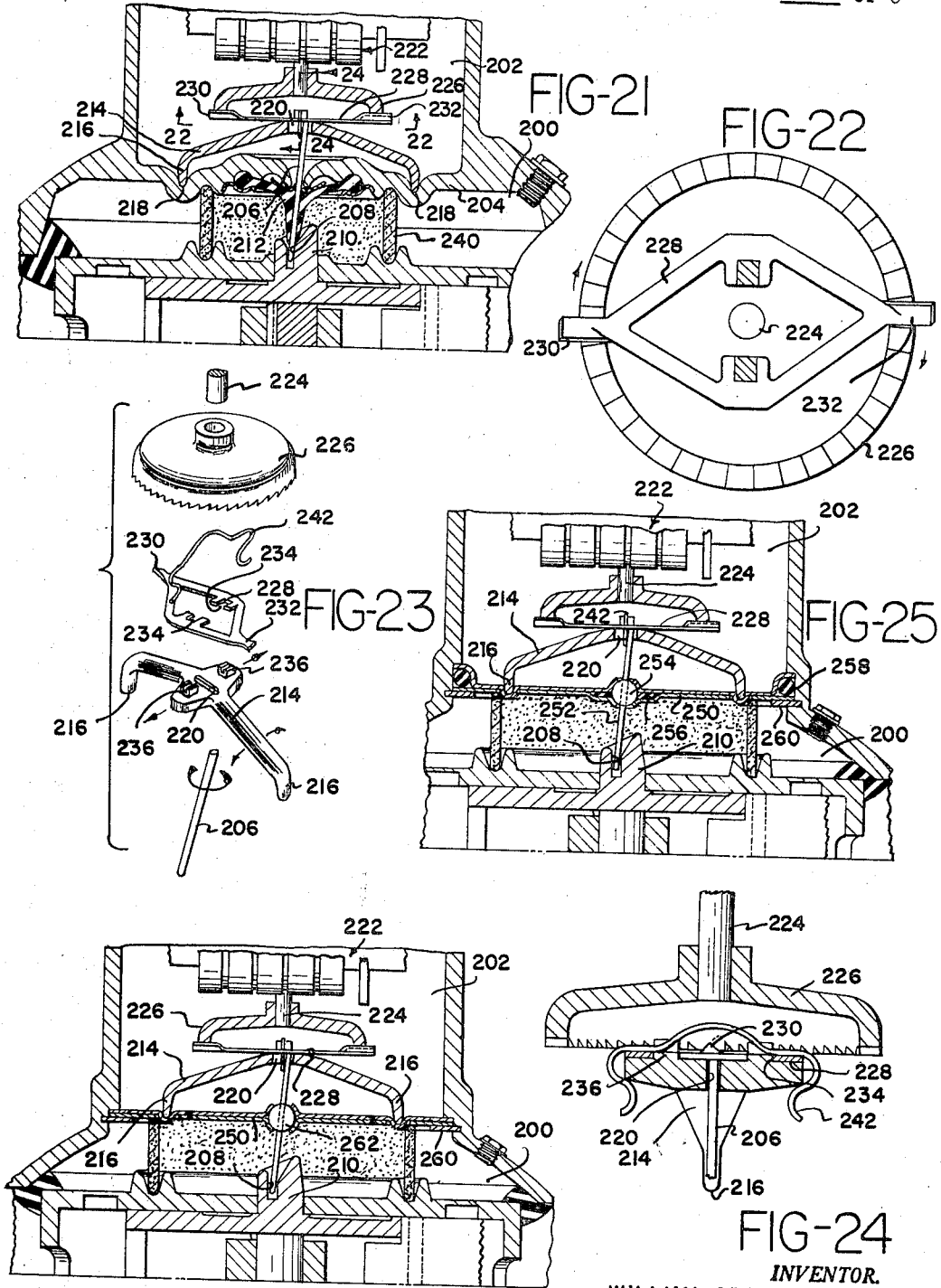

United States Patent Office 3,424,011
Patented Jan. 28, 1969

3,424,011
POWER TRANSMISSION DEVICE PARTICULARLY FOR FLUID APPLICATIONS
William Grant Pontis, 303 Wendy Lane,
Waverly, Ohio 45690
Continuation-in-part of application Ser. No. 564,457,
May 25, 1966. This application Sept. 26, 1967, Ser.
No. 677,491
U.S. Cl. 74—18.1                           11 Claims
Int. Cl. F16j 15/50

ABSTRACT OF THE DISCLOSURE

This invention discloses power transmission devices incorporating a sealed partition through which power is transmitted without interrupting the seal of the partition while providing a substantial speed reduction between the driving and driven devices that are interconnected by the power transmission. The device is constructed to avoid slippage and to reduce to a minimum any power losses between the metering and registering mechanism.

---

This is a continuation-in-part application of application S.N. 564,457 filed May 25, 1966, now abandoned.

This invention relates to motion or power transmission and couplings which use a nutating shaft or an oscillating walking beam ratchet drive, and is particularly concerned with the transmission of motion or power through a partition member located between two compartments. More particularly still, this invention relates to a transmission device for transmitting motion and power through a partition member while maintaining the partition member fluid tight and greatly minimizing any losses due to friction or the like.

There are many instances in which power or motion, the motion, of course, being accompanied by at least a small power demand, is to be transmitted through a partition member with it being desired to maintain the partition member fluid tight and at the same time to avoid any substantial power loss.

Ordinary fluid seals permit the transmission of power through a partition member but are inherently relatively high friction or non positive devices and are thus unsuitable for use where small amounts of power are to be transmitted with a precise positive drive ratio between the input and output side.

A particular instance in which an extremely small amount of power is to be transmitted through a partition member occurs in connection with fluid flow meters wherein there is a metering part of the device that is actuated by fluid passing therethrough and which drives an element, usually in rotation, which is connected for actuating a register or indicating device.

The amounts of power developed in such a case are extremely small and it is therefore of the utmost importance to avoid frictional losses between the meter and the register or indicating device. By keeping the power loss extremely small, the meter can be made to be extremely sensitive to even minute fluctuations in fluid flow rate and to be operable at extremely small rates of flow thereby providing more accurate and reliable measuring of the fluid through the meter.

It is also usually the case, particularly with fluid meter structures, that it is desired to provide for a relatively high ratio of speed reduction from the element driven by the meter to the register or indicating device. It is customary to obtain such high speed ratios by utilizing step-down gear transmissions or the like, but these, while being absolutely accurate with respect to the speed reduction obtained, are inherently high frictional devices which are accompanied, when operating, by an undesirable high loss of power.

Having the foregoing in mind, it is a primary object of the present invention to provide a number of related novel power transmission devices especially adapted for transmitting power through a fluid tight partition and with substantially no loss of power.

Another object of this invention is the provision of a number of related power transmission devices which will transmit power through a sealed partition without interrupting the said seal while, at the same time, providing for a large amount of speed reduction between the driving and driven devices that are interconnected by the power transmission.

A still further object of this invention is the provision of a number of related power transmissions especially for transmitting small amounts of power through a sealed partition which is absolutely accurate so that it can be employed where absolutely no slippage can be tolerated.

A particular object of the present invention is the provision of a number of related power transmissions and methods of transmitting power between the output element of a fluid metering device and a registering mechanism wherein power losses between the metering device and registering mechanism are maintained at a minimum while a positive drive connection is still maintained therebetween.

The several objectives referred to above are attained, in general, in an arrangement wherein a driving member is located on side of a partition and a member to be driven thereby is located on the other side and the members are connected through the partition by either (a) a nutating shaft drive coupling or (b) an oscillating walking beam ratchet drive sealed to the partition and engaging both of the said members.

As the driving member rotates, the said nutating shaft or walking beam is caused to nutate or oscillate and it has such a connection with the driven member that the driven member is, in turn, driven thereby. The axis of nutation of the shaft or oscillation of the walking beam is located substantially within the confines of the partition, which is apertured for receiving the shaft or walking beam, and a resilient fluid impervious supporting and sealing member extends between the partition member and the nutating shaft or oscillating walking beam and sealingly interconnects the shaft or beam to the partition thereby maintaining an absolute fluid tight seal between opposite sides of the partition.

The nature of the present invention and the particular manner in which the several objectives referred to are attained, as well as other objectives, will become evident upon reference to the following specification taken in connection with the accompanying drawings in which:

FIGURE 1 is a vertical sectional view through a fluid metering device with which is associated a registering mechanism with a power transmission according to this invention drivingly connecting the fluid metering device with the registering mechanism using a nutating shaft driven by an orbiting free-rolling disc;

FIGURE 2 is a plan sectional view indicated by line 2—2 on FIGURE 1 looking down on top of the portion of the power transmission that is directly associated with the metering device;

FIGURE 3 is an enlarged fragmentary view showing the seal, a cup like thrust member, and a nutating shaft;

FIGURE 4 is a sectional view indicated by line 4—4 on FIGURE 1 looking up beneath the partition element that separates the compartment containing the metering device from the compartment containing the registering mechanism;

FIGURE 5 is a more or less diagrammatic plan sectional view indicated by line 5—5 on FIGURE 1 showing a registering mechanism;

FIGURE 6 is a fragmentary view showing a modified form of power transmission using a nutating shaft driven by an orbiting drive arm;

FIGURE 7 is a plan sectional view indicated by line 7—7 on FIGURE 6 showing the construction of the power transmission;

FIGURE 8 is a view similar to FIGURE 6 but shows a somewhat modified arrangement particularly with respect to the seal between the nutating shaft and the partition through which it extends;

FIGURE 9 is a fragmentary view drawn at greatly enlarged scale showing the flexible support for the nutating shaft more in detail;

FIGURE 10 is a sectional view indicated by line 10—10 on FIGURE 8 showing the connection of the nutating shaft with the input shaft of the registering mechanism;

FIGURE 11 is a fragmentary view similar to FIGURE 8 showing still another modification wherein the nutating member is driven by a ball rollingly carried in a race attached to the output member of the fluid metering device;

FIGURE 12 is an enlarged fragmentary view showing the ball drive arrangement of FIGURE 11 more in detail;

FIGURE 13 is a view like FIGURE 12 but illustrates another manner in which a ball could be employed as the driving connection between the nutating member and the meter output shaft;

FIGURE 14 is a fragmentary view showing still another power transmission in which the nutating shaft is driven by an orbiting driving bridge.

FIGURE 15 is a plan sectional view indicated by line 15—15 on FIGURE 14 showing more in detail the connection of the driving bridge mounted on its two diametrically opposite planet pinions;

FIGURE 16 is a fragmentary view of a modification similar to that of FIGURES 14 and 15, except that the orbiting driving bridge embodies a friction reducing roller arrangement between the nutating shaft and the driving bridge;

FIGURE 17 is a fragmentary view showing modification which embodies an oscillating (not nutating) walking beam ratchet wheel drive;

FIGURES 18 and 19 are plan views looking down on top of the output member of the metering device and showing the manner in which the oscillating walking beam is connected therewith;

FIGURE 20 is a perspective view showing the manner in which the oscillating walking beam ratchet wheel driver is connected with the registering mechanism for transmitting motion and power thereto;

FIGURE 21 is a fragmentary sectional view showing a nutating shaft coupled to a two-directional ratchet wheel driver;

FIGURE 22 is a transverse sectional view indicated by line 22—22 on FIGURE 21 looking up beneath the ratchet wheel;

FIGURE 23 is an exploded perspective view showing the essential elements of the two-directional ratchet wheel drive arrangement of FIGURE 21;

FIGURE 24 is a vertical sectional view indicated by line 24—24 on FIGURE 21;

FIGURE 25 is a sectional view similar to FIGURE 21 but showing a modified arrangement;

FIGURE 26 is a sectional view similar to FIGURE 25 showing another slightly modified construction;

Figure 28:
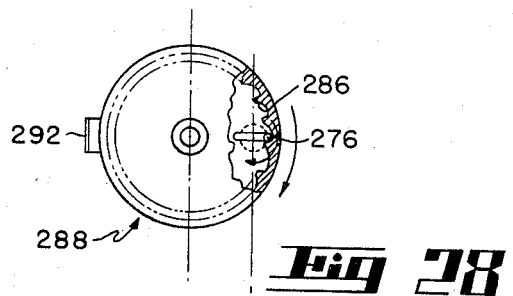
FIGURE 28 is a top plan view, partly in section, of the ratchet wheel and stabilizer of FIGURE 27.

The couplings of this invention are illustrated with a vane-type fluid meter, but are intended for use with any type of metering or other prime motivating apparatus which uses a nutating shaft or an osciallating walking beam ratchet drive.

Referring to the drawings somewhat more in detail, FIGURES 1 and 2 illustrate a fluid metering device which is mounted within a housing consisting of an upper part 10 and a removable part 12. Part 10 has an inlet 14 and an outlet 16 and sealingly mounted within the housing between the inlet and outlet is the metering device proper which consists of a cylinder 18 having an inlet port 20 and an outlet port 22.

Rotatably mounted in the cylinder is a rotor 24 having vanes 26 pivoted thereto. As fluid passes through the cylinder, the rotor is driven in rotation by the action of the fluid on the vanes. The vanes preferably include portions 28 extending into the interior of the rotor for being acted on by an actuator member 30 stationarily mounted within the rotor and this serves to hold the vanes in engagement with the wall of the cylinder during the movement of the vanes from the inlet port to the outlet port.

This occurs on one side of the cylinder, which is substantially concentric with the rotor while on the opposite side of the cylinder, the cylinder is formed inwardly so as to be tangential to the rotor.

The inlet 20 is preceded by a screen 32 and the space immediately inwardly of the screen 32 is communicated with the chamber 34 at the bottom of the cylinder and with a chamber 36 at the top of the cylinder. Chamber 34 communicates through an annular filter 38 with a space that is connected by a passage 40 with the interior of the rotor.

Similarly, fluid in chamber 36 can pass through an annular filter element 42 into a compartment 44 which houses a portion of the transmission mechanism according to the present invention.

The particular meter construction is illustrated and described in detail in my co-pending application Ser. No. 409,044 filed Oct. 28, 1964 and applications Ser. No. 94,882 filed Mar. 10, 1961 and Ser. No. 94,281 filed Mar. 8, 1961 both now abandoned.

*Nutating shaft driven by an orbiting free-rolling disc*

In FIGURE 1, the prime mover output shaft 46 extends upwardly through the top wall of the cylinder into compartment 44. Within this compartment the shaft 46 carries a sun gear 48 that meshes with an intermediate planet carrier pinion 50 which, in turn, meshes with a large internal stationary gear 52 attached to or formed integrally with the top wall of cylinder 18.

It will be evident that, as the prime mover output shaft 46 rotates, the sun gear 48 will rotate and the intermediate planet carrier pinion 50 will be caused to rotate around inside stationary ring gear 52 at a speed greatly reduced from the speed of rotation of the prime mover output shaft 46. The intermediate carrier pinion 50 is preferably held in position by an annular plate 54 attached to the stationary ring gear 52 and which overlays the intermediate planet carrier pinion 50 to a substantial extent (see FIGURE 2).

Planet pinion 50 has a central shaft 56 on which is rotatably mounted a free rolling disc member 58 somewhat larger in radius than the sum of the radii of gear 48 and planet pinion 50.

This disc 58 is availed of for actuating a nutating shaft 60 which has its lower end disposed in compartment 44 and its upper end disposed in compartment 44. Located within compartment 62 is a registering mechanism 66 of any type which can be driven by rotation or other motion of a register drive coupling 68 (see FIGURE 5).

The nutating shaft 60 extends through an aperture 70 formed in partition 64 which aperture generally converges downwardly and immediately beneath the partition 64. The member 60 has attached thereto a cup-like thrust member 72 which bears upwardly and beneath the arcuate periphery of the aperture.

In FIGURE 3, the bearing circles of contact between the cup-shaped thrust washer 72 and the aperature arcuate circle bearing (not numbered) are a true rolling action because the two bearing circle-diameters are the same.

Nutating shaft 60 has cemented bonded, or vulcanized thereto resilient diaphragm member 74 which has an enlarged peripheral portion 76 which seats in a correspondingly shaped recess in the underside of partition 64. A snap ring or retainer member 78 is secured, snapped, or pressed over the peripheral portion 76 of the diaphragm member and thus holds it in place on the partition and seals the diaphragm member to the partition. A sealing cement could be employed in addition to the retainer member, if so desired.

As shown in FIGURE 1, the diaphragm member includes a portion 80 extending downwardly along the lower part of nutating member 60 for engagement with the periphery of disc 58.

It will be apparent that rotation of the prime mover output shaft 46 will cause rotation of sun gear 48 and this, in turn, will cause rotation of planet pinion 50 around the inside of stationary ring gear 52 at a greatly reduced speed and that for each complete revolution of planet pinion 50 around the inside of stationary ring gear 52, nutating shaft 60 will cause one complete nutation and register input drive member 68 of the registering mechanism one complete rotation.

The portion of the mechanism that comprises the sun gear, intermediate planet carrier pinion, and stationary ring gear can be made to eminently satisfactory tolerances by molding techniques, since the power transmission is usually extremely low, such gearing has extremely long life.

FIGURES 1, 2, 3 and 4 illustrate selected speed ratio-reduction mechanisms described above.

*Nutating shaft driven by an orbiting driving arm*

In FIGURES 6 and 7, there is shown an arrangement similar to the one described in FIGURES 1 through 4 and wherein corresponding parts bear the same reference numeral. In the modification of FIGURES 6 and 7, there is provided an orbiting drive arm 69 rotatably mounted on shaft 56 of planet carrier pinion 50. The arm 69 extends toward the axis of rotation of the sun gear 48 and fits loosely over a center projection 73 that extends upwardly from the planet carrier pinion 50.

The end of arm 69 at a point over and beyond the center is provided with a notch 74 that receives the lower end of nutating shaft 76 so that as planet carrier pinion 50 rotates around inside of stationary ring gear 52, the nutating shaft 76 will be caused to nutate and thereby to drive register input drive member 78 of the registering mechanism in the compartment 62.

FIGURES 8, 9 and 10 show a modification similar to FIGURES 6 and 7, except that in FIGURES 8, 9 and 10 the nutating shaft 80 is substantially completely supported by its diaphragm 82 and does not embody a thrust washer similar to washer 72 in FIGURES 1 through 7. The nutating shaft 80 in FIGURES 8, 9 and 10 is nutated by an orbiting drive arm 84 and is adequately supported by the diaphragm to couplingly engage the lower end of the register input drive member 86. FIGURES 6, 7, 8, 9 and 10 also illustrate selected speed ratio-reduction mechanisms.

*Nutating shaft driven by an orbiting ball*

FIGURES 11 and 12 show a nutating shaft driven by an orbiting ball wherein the prime mover output shaft 90, that is driven in rotation, carries a member 92 having a ball race 94 therein in which rolls a ball 96. This ball engages the underside of the nutating member supporting diaphragm 98 and pushes the diaphragm upwardly into an annular recess provided on the underside of partition 100 for this purpose.

The diaphragm 98 in the FIGURES 11 and 12 has an edge portion which is T-shaped in cross-section as will be seen at 102 in FIGURE 12. This T-shaped edge portion 102 is received by the annular seal rings 104 that are held in place against the diaphragm 98 by a retaining cup 106 that is, in turn, held in place by a snap ring 108.

The nutating shaft 110 is molded directly in the material of the diaphragm and at the bottom of rod 110 is a disc-like element 112, the periphery of which extends well into the region of influence of the rolling ball 96 so that as the ball rolls around under the diaphragm 98, the nutating shaft 110 will nutate and drive the register input member 114 of the registering mechanism.

FIGURES 11 and 12 illustrate a two-one ratio-speed reduction mechanism.

FIGURE 13 illustrates a modification of the construction of the FIGURES 11 and 12 wherein the ball member 116 is supported and turns on a transverse axle member 118 with there being clearance at 120 between the ball and the member 122 that is attached to the prime mover output shaft 124 and driven thereby.

The FIGURE 13 arrangement prevents any slipping of the ball and insures absolutely accurate driving of the nutating shaft 110. FIGURE 13 is a one-to-one speed ratio mechanism.

*Nutating shaft driven by orbiting driving bridge*

In FIGURES 14 and 15, there is shown an arrangement wherein the sun gear 130 on the prime mover output shaft engages two diametrically opposite planet carrier pinions 132 which rotate within an internal stationary ring gear. Each of the orbiting carrier pinions 132 has a center shaft 134 and between which shafts there extends the nutating shaft driving bridge 136. The driving bridge 136 has an off center notch 138 that engages the lower end of nutating shaft 140. The upper end of the nutating shaft 140 drivingly engages the register input drive member 142 of the registering mechanism.

The modification of FIGURE 16 is similar to FIGURES 14 and 15 except that in FIGURE 16 the drive roll bridge 144, extending or orbiting bridging across the two planet pinions 132, carries a free roller 146 which engages the lower end of nutating shaft 148. The free roller 146 is pivotally supported by a roll bearing pin (the roll bearing pin and cotter pin retainer shown in FIGURE 16 are not numbered).

Since the nutating shaft 148 nutates does not rotate, the provision of roller 146 greatly reduces the frictional engagement of the nutating shaft with the drive roll bridge 144 and thereby reduces even further the small amount of power loss that occurs in the power transmission. The angular attitude of engagement between the nutating shaft 148 and the roller 146, as seen in FIGURE 16, results in the roller carrying both the load of the shaft angle of displacement and the rotational torque load of driving the nutating shaft. FIGURES 14, 15 and 16 also represent selected speed reduction mechanisms.

*Oscillating (not nutating) walking beam rachet drive*

FIGURES 17 through 20 show an arrangement in which, instead of a nutating member, an oscillating walking beam ratchet wheel driving member is employed. Referring to FIGURE 17, the prime mover output shaft is at 150 and it carries a link 152 on an off center pivot 154. The other end of the link 152 engages the lower end of oscillating walking beam member 156 so that as the prime mover output shaft 150 turns, the lower end of oscillating walking beam 156 will be caused to move back and forth.

The oscillating walking beam member 156 extends through an aperture 158 in the partition 160 that separates the prime mover drive compartment 162 from the register compartment 164. On the underside of the partition 160, three are formed recesses 166 (see FIGURE 20) that define half bearings for receiving the ends of a trunnion shaft 168 fixed to oscillating walking beam member 156.

The oscillating walking beam member carries a resilient sealing diaphragm 170 which seals about the aperture 158 in the partition 160, the diaphragm 170 also resiliently supports the oscillating walking beam member and urges the trunnion shaft 168 into the half bearings 166.

The upper end of oscillating (not nutating) walking beam member 156 is formed at 172 so as to engage teeth 174 of a ratchet wheel 176 when the oscillating walking beam member is moving in one direction and to pass idly over the teeth when moving in the other direction. A holding pawl 178 is provided for preventing reverse rotation of the ratchet wheel when the oscillating walking beam member is returning following a working stroke thereof.

The ratchet wheel 176 is mounted on a register input drive shaft 180 to drive the register.

The transmission of FIGURES 17 through 20 is capable of high reduction ratios while at the same time running extremely light and imposing substantially no burden upon the prime mover.

A feature of the arrangement of FIGURES 17 through 20 is to be found in the provision of the slot 157 in the end of link 152 which slot receives the lower end of oscillating walking beam 156. It will be apparent that rotation of the prime mover output shaft 150 in the direction of the arrows (see FIGURES 18 and 19) thereon will always move the link 152 into coupling engagement with the lower end of oscillating walking beam 156 so that it is only necessary to insert the prime mover mechanism into a housing and, thereafter, during the first complete rotation of the prime mover output shaft 150, the oscillating walking beam 156 will be caught in the slot 157 and thus drivingly engaged with the link 152. This driving connection will be maintained because the frictional forces, even though small, which are transmitted from the prime mover output shaft 150 to the link 152 will urge the link into engagement with the oscillating walking beam and cause full engagement of the coupling open slot 157 in the link 152 with the oscillating walking beam thus effecting the desired driving connection between the prime mover mechanism and the register mechanism.

The filter 42 provides for a supply of fluid into compartment 162 thereby to lubricate the portion of the transmission mechanism below the compartment separating partition 160.

In the structure of FIGURES 17 through 20, there is an absolute fluid tight seal about the aperture in the partition 160 between the prime mover transmission chamber 162 and the driven register chamber 164, but, at the same time, there is a positive drive of the registering mechanism and a high reduction in speed from the prime mover output shaft 150 to the register input drive shaft 180.

The transmission according to my invention is highly efficient, but is light and inexpensive to manufacture and is easy to install without requiring any more than a minimum of machine work.

*Nutating shaft coupled to a two-directional ratchet wheel driver*

A further drive arrangement according to the present invention is illustrated in FIGURES 21 through 26. In these figures, the prime mover compartment 200 is separated from the register compartment 202 by a partition 204. Extending through the partition member 204 is a nutating drive shaft 206 having its lower end engaged in the eccentric bore 208 of the prime mover output shaft 210.

The diaphragm 212 is sealed to the partition 204 and sealingly mounts the nutating shaft 206. The flexible diaphragm 212 permits free nutation of the nutating shaft 206 as the prime mover shaft 210 rotates.

Above the partition 204, there is mounted a yoke 214 having dependent legs 216 with rounded bearing ends, which are received in rounded recesses 216 in the top surface of the partition 204. The yoke 214 is thus rockingly supported on the partition 204 and the partition and yoke are so constructed and arranged that the transverse axis on which the yoke rocks also passes through the center of nutation of nutating shaft 206. For transmitting motion from nutating shaft 206 to yoke 214, the shaft slidably engages a close fitting slot 220 formed in the yoke.

The register mechanism is generally indicated at 222 in the register compartment 202 and has extending therefrom a register input drive member 224 on which is mounted a ratchet wheel 226. The ratchet wheel is adapted for being driven in response to rocking movements of yoke 214 by means of a ratchet wheel drive spring plate 228 carried on the yoke 214 and having ratchet teeth 230 and 232 formed on its opposite ends.

As will be seen in FIGURE 23, plate 228 has notches 234 formed therein that receive the lug elements 236 on the top of the yoke member 214 so that the spring plate is fixedly held on the yoke member and will move therewith as the yoke member rocks. The ratchet wheel 226 has its periphery depending into engagement with the ratchet wheel drive plate 228 and this, in one direction of movement of yoke 214, the ratchet tooth at one end thereof will drive the ratchet wheel, while the tooth at the other end cams over the teeth of the ratchet wheel, and, in the opposite direction of movement of the yoke, the second ratchet tooth on the plate 228 will drive the wheel while the first mentioned ratchet tooth will cam over the teeth on the wheel.

The ratchet wheel 226 is thus driven in one and the same direction by both directions of movement of the yoke 214.

The drive ratio between the prime mover output shaft 210 and the ratchet wheel 226 can be varied by varying the amount of nutation of shaft 206 to thereby vary the rocking movement of yoke 214; by varying the size of the ratchet wheel teeth to conform with the amount of rocking movement of the yoke; and by eliminating one of the drive teeth on the plate carried by the yoke and, instead, providing the ratchet wheel with a detent whereby it is driven by only one directional of movement of the yoke.

An advantage of the described arrangement resides in the fact that the register mechanism can be removed from the housing and thereafter replaced without making any changes or adjustments in the drive arrangement. Similarly, the prime mover mechanism can be removed from the lower part of the housing, and this will not in any way require any changes of adjustment in the mechanism when another prime mover mechanism is placed therein.

It is preferable for the device to include an annular filter element 240 surrounding the nutating shaft.

For the purpose of holding the ratchet wheel drive plate 228 on the rocking yoke 214 during initial assembly, a wire clip 242 may be provided to hold the plate to the yoke but the clip 242 does not in any way interfere or add to the operation of the drive arrangement.

In FIGURE 25, there is shown an arrangement wherein a partition 250 is made up of stampings, preferably two plates welded together, with the nutating shaft 252 including a ball 254 sealed in a socket in the center of the partition by a seal element 256. The periphery of the partition is sealed in the housing by seal element 258, and the partition is retained in place in the housing by a snap ring 260. All other parts of FIGURE 25 are the same as those already described in FIGURES 21 through 24.

In FIGURE 26, there is shown a modification similar to that of FIGURE 25 except that no seal is provided around ball 262 of the nutating shaft. In the FIGURE 26 modification, the same environment exists, both above and below the partition, and, in many cases, this would be satisfactory, particularly, if it were desired to have an inexpensive structure for metering harmless gases or liquids.

Figure 27:
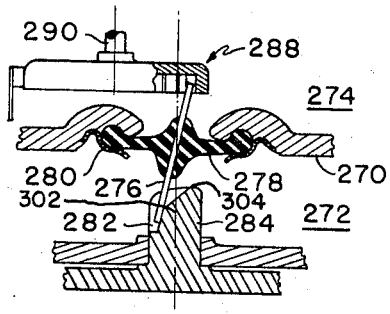
FIGURE 27 is a fragmentary sectional view, partly in elevation, showing another modification of the power transmission of the present invention.

Referring to FIGURES 27 and 28, there is shown a partition 270, which separates a prime mover compartment 272 from a register compartment 274. A nutating shaft 276 is substantially completely supported by a diaphragm 278 in the same manner as described for the modification of FIGURES 8 to 10.

The diaphragm 278 is held in place on the partition 270 by an annular snap ring or retainer member 280. The snap ring 280 seals the diaphragm member 278 to the partition 270.

The nutating shaft 276 has its lower end disposed within a notch 282 of a prime mover output shaft 284, which is the driving member. Thus, the lower end of the nutating shaft 276 is engaged with the shaft 284 to be nutated thereby when the shaft 284 rotates.

The upper end of the nutating shaft 276 cooperates with internally disposed teeth 286 on a ratchet wheel 288. The ratchet wheel 288 is adapted to be connected, for example, to a shaft 290 of a register mechanism. If desired, a pinion could be mounted on the top of the ratchet wheel and cooperate with other gears to create a further speed reduction between the shaft 284 and the register mechanism rather than the direct connection through the shaft 290.

During each cycle of nutation of the shaft 276, the upper end of the shaft 276 engages one of the teeth 286 on the ratchet wheel 288 only during a portion of the cycle of nutation. Thus, there is a substantial speed reduction between the shaft 284 (the driving member) and the shaft 290 (the driven member) because of the intermittent drive of the ratchet wheel 288 by the shaft 276.

When the shaft 276 is not engaging with one of the teeth 286 on the ratchet wheel 288, a stabilizer 292 retains the ratchet wheel 288 in position until the shaft 276 again engages one of the teeth 286 on the ratchet wheel 288. The stabilizer 292 may be any suitable mechanism such as a brake, a snubber, a latch, or a pawl, for example. It should be understood that the stabilizer 292 is synchronized with the timed driving engagement of the nutating shaft 276 with the succeeding teeth 286 of the ratchet wheel 288.

With the modification of FIGURES 27 and 28, a very simple construction is provided for automatically providing the optimum rate of speed reduction between a driving member and a driven member. Furthermore, while the structure of FIGURES 27 and 28 is shown in use with two separate atmospheres, which are fluid sealed from each other, it should be understood that it may have utility wherever speed reduction from a driving member to a driven member by means of a simple mechanism is desired.

It will be understood that this invention is susceptible to modification in order to adapt it to different usages and conditions; and, accordingly, it is desired to comprehend such modifications within this invention as may fall within the scope of the appended claims.

The converging sidewalls 301 on FIGURE 16 of the eccentric driving notch 282 on FIGURE 27 cams the nutating shaft 148 on FIGURE 16 and 276 on FIGURE 27 into angular operable attitude. The rotatable driving member 284 on FIGURE 27 has its axis 302 on FIGURES 16 and 27 falling within the confines of the inner edge 304 in FIGURE 27 of the entrance of said notch; and said notch terminates at a point 303 on FIGURE 16 eccentric to the axis 302 of said rotatable driving member 284.

In this structure, the axis of the driving member falls within the inner perimeter edge of the entrance to the driving notch and the notch is eccentric to the axis of the driving member.

I claim:

1. In a transmission for coupling a rotatable driving member to a rotatable driven member, said transmission including a nutating shaft, a flexible diaphragm supporting said nutating shaft intermediate its ends to allow said shaft to nutate, means to couple one end of said nutating shaft to said rotatable driver, said means consisting of a sun gear rotated by said rotatable driving member, a pair of diametrically opposite planet pinions meshing with said sun gear, a stationary internal ring gear having said pinions meshing with and rotating therein, an orbiting driving bridge pivotally mounted on said planet pinions, engaging means on said bridge for engaging one end of said nutating shaft to cause nutating thereof when said driving member rotates, and with the other end of said nutating shaft engaging said rotatable driven member.

2. The transmission according to claim 1 in which said engaging means on said bridge includes a roller pivotally mounted on said bridge.

3. In a transmission for coupling a rotatable driving member to a rotatable driven member, said transmission including a nutating shaft, a sealed flexible diaphragm supporting said nutating shaft intermediate its ends to allow said shaft to nutate coupling means to couple one end of said nutatable shaft to said rotatable driving member, said coupling means including an inclined notch having converging side walls, said rotatable driving member having its axis falling within the confines of the inner edge of the entrance of said notch terminating at a point eccentric to the axis of said rotatable driving member, and the other end of said nutatable shaft engaging said rotatable driven member.

4. The transmission according to claim 1 in which said engaging means on said bridge consists of an off-center notch shaped member embodying an inclined cam terminating at an off-center coupling notch on said rotatable driving member, said cam shaped to engage said nutating shaft and maintain said nutating shaft in an angular operable position.

5. The transmission according to claim 3 in which said coupling means consists of a speed reduction gearing on the rotatable driving member side of said diaphragm, an orbiting pinion, a driving arm operatively associated with said orbiting pinion, a sun gear, said driving arm extending to and beyond the axis of said sun gear, said driving arm engaging said nutating shaft to cause nutation thereof, with the other end of said nutating shaft engaging the rotatable driven member.

6. The transmission according to claim 3 in which said other end of said nutating shaft engages said rotatable driven member, a ratchet wheel connected to said driven member, said ratchet wheel having teeth engaged by said nutating shaft during only a portion of each cycle of nutation of said nutating shaft, and means to prevent movement of said ratchet wheel when said nutating shaft is not in driving engagement therewith.

7. The transmission according to claim 3 in which said one end of said nutating shaft engages said driving member, a pivotally mounted yoke, said yoke engaged by said other end of said nutating shaft, a ratchet wheel attached to said driven member, and means transmitting the movement of said yoke to said ratchet wheel to rotate the driven member when said driving member rotates.

8. In a transmission for coupling a rotatable driving member to a rotatable driven member, said transmission including a nutating shaft, a flexible diaphragm supporting said nutating shaft intermediate its ends to allow said shaft to nutate, coupling means to couple one end of said nutating shaft to said rotatable driving member, said coupling means consisting of speed reducing gearing, including an orbiting pinion, a free roll, means pivotally supporting said free roll, said free roll having its perimeter engaging said nutating shaft to cause nutation thereof when said driving member rotates, with the other end of said nutating shaft engaging said rotatable driven member.

9. In a transmission for coupling a rotatable driving member to a rotatable driven member, said transmission including a nutating shaft, a flexible diaphragm supporting said nutating shaft, coupling means to couple one end of said nutating shaft to said rotatable driving member, a raceway supported and driven by said rotatable driving member, said diaphragm having a ball raceway formed therein and a ball rotatably disposed between said first mentioned raceway and said raceway on said diaphragm to allow said ball to roll in between the two raceways and to cause nutation of said nutating shaft when the rotatable driving member rotates, and with the other end of said nutating shaft engaging said rotatable driven member.

10. The transmission according to claim 9 in which said ball has a bearing hole therethrough, a bearing shaft supported on said rotatable driving member, and said ball being supported on said bearing shaft extending through said bearing hole.

11. The transmission according to claim 9 in which said nutating shaft has a supporting disc integral therewith and said supporting disc being secured within said diaphragm and integral therewith.

References Cited
UNITED STATES PATENTS

| | | | |
|---|---|---|---|
| 375,108 | 12/1887 | Tilden | 74—18.1 |
| 1,644,775 | 10/1927 | Fulton | 74—18.1 |
| 2,454,340 | 11/1948 | Reichel | 74—18.1 |

FRED C. MATTERN, JR., *Primary Examiner.*

F. D. SHOEMAKER, *Assistant Examiner.*